United States Patent [19]

Reed et al.

[11] Patent Number: 4,969,227
[45] Date of Patent: Nov. 13, 1990

[54] DRIVE MECHANISM FOR OVERLAPPING WIPERS

[75] Inventors: Glenn R. Reed, Dayton; Harry C. Buchanan, Jr., Spring Valley, both of Ohio

[73] Assignee: General Motors Corporation, Detroit, Mich.

[21] Appl. No.: 331,489

[22] Filed: Mar. 31, 1989

[51] Int. Cl.⁵ .................................................. B60S 1/06
[52] U.S. Cl. ........................ 15/250.14; 15/250.27; 15/250.30; 15/250.31; 74/25
[58] Field of Search ........... 15/250.13, 250.14, 250.27, 15/250.28, 250.30, 250.31, 250.34; 74/25, 42, 50, 51, 70, 75, 79

[56] References Cited

U.S. PATENT DOCUMENTS

| | | | |
|---|---|---|---|
| 1,953,731 | 4/1934 | Thibault | 74/14 |
| 2,393,193 | 1/1946 | Sacchini | 74/50 |
| 2,494,538 | 1/1950 | Baldo | 74/79 |
| 3,025,552 | 3/1962 | Contant | 15/250.16 |
| 3,025,553 | 3/1962 | Fox et al. | 15/250.16 |
| 3,025,554 | 3/1962 | Ziegler | 15/250.14 |
| 3,060,479 | 10/1962 | Simpson et al. | 15/250.14 |
| 3,428,995 | 2/1969 | Pollock | 15/250.34 |
| 3,829,924 | 8/1974 | Dittrich et al. | 15/250.14 |
| 4,358,869 | 11/1982 | Frankus | 15/250.3 |
| 4,720,885 | 1/1988 | Leroy et al. | 15/250.21 |

FOREIGN PATENT DOCUMENTS

| | | | |
|---|---|---|---|
| 709118 | 5/1965 | Canada | 15/250.14 |
| 1580743 | 7/1970 | Fed. Rep. of Germany | 15/250.27 |
| 2647510 | 4/1978 | Fed. Rep. of Germany | 15/250.34 |
| 868387 | 9/1941 | France | 15/250.27 |
| 647312 | 10/1962 | Italy | 15/250.14 |

Primary Examiner—Harvey C. Hornsby
Assistant Examiner—Mark Spisich
Attorney, Agent, or Firm—Patrick M. Griffin

[57] ABSTRACT

A drive for overlapping wipers includes a pair of wiper shafts offset to different sides of a drive shaft, each driven by a spatial mechanism, which, by virtue of the offset from the drive shaft, creates a position and speed differential between the wipers that prevents them from colliding at inner wipe.

3 Claims, 11 Drawing Sheets

DRIVE MECHANISM FOR OVERLAPPING WIPERS

This invention relates to vehicle windshield wipers generally, and specifically to a drive mechanism for a pair of vehicle wipers of the type that overlap at their inner wipe positions.

BACKGROUND OF THE INVENTION

The wipers in many vehicles wipe back and forth simultaneously in the same direction, generally referred to as a tandem system. Some windshields, however, are shaped and sized such that the wipers must wipe simultaneously and in opposite directions, from a lowermost, inner wipe position to an uppermost, outer wipe position and back. This is necessary in order to wipe a sufficient portion of the windshield surface, sometimes called the legal area. Sometimes, the windshield is so large that the wipers must be so long that they overlap at inner wipe, with one wiper resting on top of the other at inner wipe. In that case, the wiper drive mechanism must have a provision for preventing the top and bottom wipers from colliding both as they leave inner wipe at the beginning of a wipe cycle, and as they return to inner wipe at the end of the cycle. The typical production drive mechanism for such a system uses a bell crank linkage designed to assure that the top wiper will begin to move up from inner wipe faster than the bottom wiper at the beginning of the wipe cycle, and so prevent collision. However, an undesirable result of the bell crank type mechanism is that one of the wipers will experience sudden acceleration of "whip" at outer wipe, which can potentially take it past the ideal outer wipe position. Another drawback of the bell crank type drive mechanism is that it uses a number of large and heavy links, and occupies a large under hood volume.

SUMMARY OF THE INVENTION

The invention provides a new drive mechanism for overlapping wipers that prevents inner wipe collision without causing high outer wipe acceleration, and which is also more compact.

In the preferred embodiment disclosed, a straight, tubular drive shaft is journaled to the vehicle body to rotate about a central axis that runs generally along and below the lower edge of the windshield, thus occupying very little space and volume. A drive motor rotates the drive shaft at a substantially constant angular speed. A first wiper shaft is journaled to the vehicle body near one end of the drive shaft, generally normal thereto, and a second wiper shaft is similarly journaled to the vehicle body near the other end of the drive shaft. The drive shaft is not square to the wiper shafts, however. Instead, each wiper shaft axis is offset from the drive shaft axis by a predetermined amount, but on opposite sides of the drive shaft axis.

The top wiper is fixed to the first wiper shaft, and the bottom wiper to the second. Each wiper shaft and wiper is oscillated by a spatial mechanism driven from the drive shaft. In the embodiment disclosed, each spatial mechanism is of the four bar spatial type. The components of each spatial mechanism are sized and oriented so as to yield the desired inner wipe and outer wipe position for each wiper. Compared to the bell crank type mechanism, the accelerations of the wipers are gentler near both inner wipe and outer wipe, avoiding the whipping problems of the prior art. That characteristic alone, however, does not prevent the wipers from colliding near inner wipe.

Collision is prevented by the opposed offsets of the wiper shaft axes from the drive shaft axis, which creates an asymmetrical shifting, in opposite directions, of the angular position of each wiper as a function of drive shaft input. In other words, because of the offsets, during the first half of each wipe cycle, the angular position of the top wiper will be ahead of where it would have been without the offset, and the corresponding angular position of the bottom wiper will be behind where it would have been with no offset. The top wiper will, therefore, start out faster, and will stay ahead of the bottom wiper, position wise, for the first half of cycle, until they reach outer wipe. With a large enough offset, the top wiper will stay far enough ahead of the bottom wiper, near the start of the wipe cycle, to prevent collision. For the second half of the wipe cycle, that differential is reversed. That is, the bottom wiper starts back from outer wipe faster than the top wiper, and stays far enough ahead of it to prevent collision as they return to inner wipe at the end of the cycle. In addition, since the amount of the offset for each wiper shaft is the same, although opposed, the speed of each wiper at each corresponding point in the wipe pattern will be the complement of the other. Furthermore, having only the one tubular drive shaft running across the vehicle body with the spatial mechanisms at the ends of the drive shaft, the mechanism is significantly more compact.

It is, therefore, an object of the invention to provide a drive mechanism for overlapping wipers that will prevent their collision near inner wipe without causing high accelerations at outer wipe.

It is another object of the invention to provide such a drive mechanism by offsetting the axis of each of the wiper shafts to opposite sides of a drive shaft axis, and driving each of the wipers with a spatial mechanism at each end of the drive shaft, with the amount of the offset being sufficient that the wipers will in turn move with a position and speed differential near inner wipe that is sufficient to prevent collision.

It is another object of the invention to provide a drive shaft which is a single tube running across the vehicle body, with the drive shaft axes offset to either side thereof, so as to give a compact mechanism that uses little under hood space.

DESCRIPTION OF THE PREFERRED EMBODIMENT

These and other objects and features of the invention will appear from the following written description, and from the drawings, in which.

Figure 1:
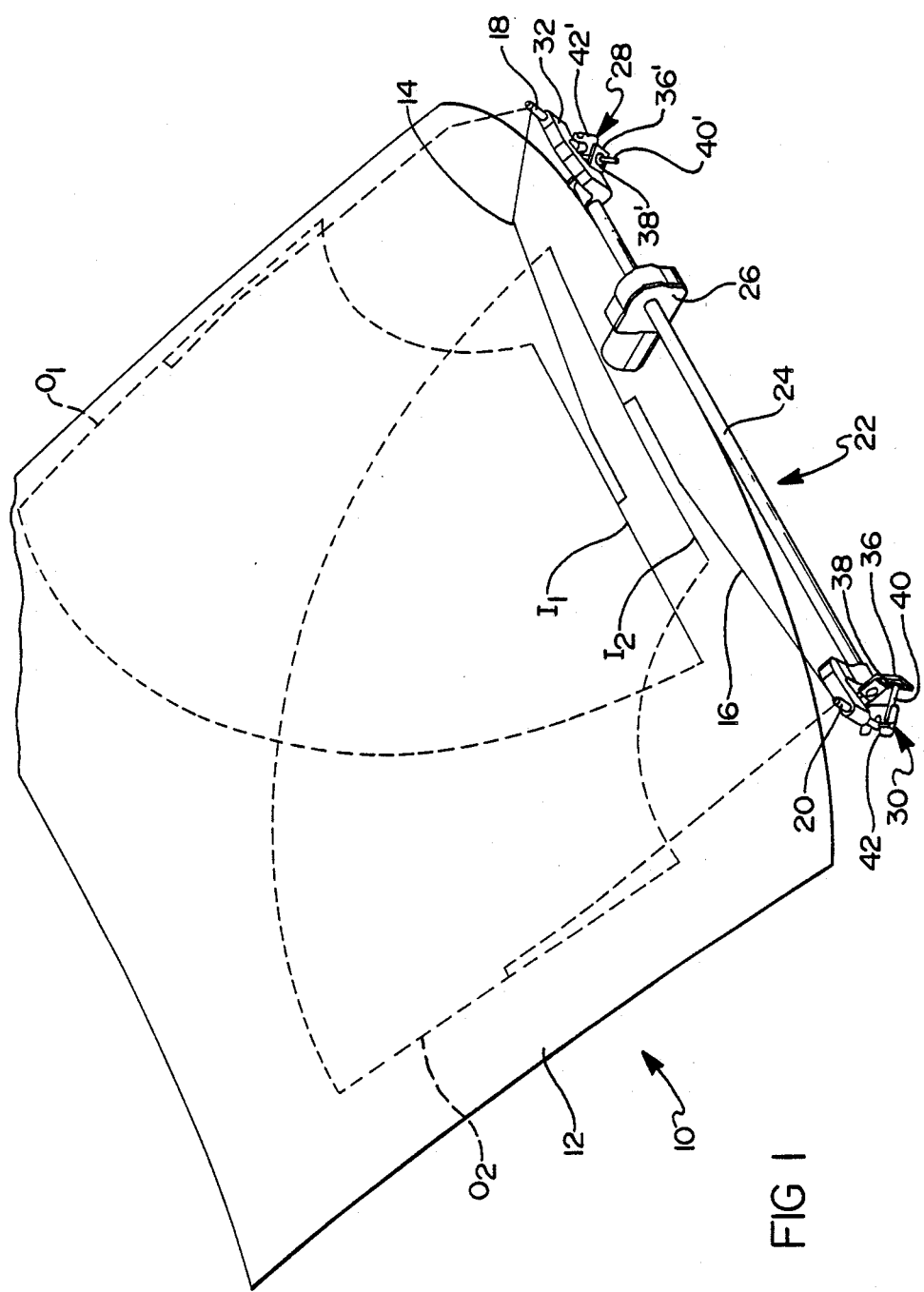
FIG. 1 is a perspective view of a vehicle windshield and a pair of wipers, showing the wipe patterns of the two wipers and a preferred embodiment of the drive mechanism of the invention.

Referring first to FIG. 1, a vehicle body, indicated generally at 10, has a windshield 12 that is wiped by a first, driver side wiper 14, and a second, passenger side wiper 16. Each wiper 14 and 16 is fixed to a respective wiper shaft 18 and 20, which are journaled to the vehicle body 10. The wiper shafts 18 and 20 are located at the same distance from the lower edge of windshield 12 and are basically symmetrical to the center plane of vehicle body 10, as well as substantially perpendicular to the plane of the windshield 12. Each wiper 14 and 16 wipes a pattern on the windshield 12 that extends over a wipe cycle from an inner wipe position 11 and 12 respectively to an outer wipe position 01 and 02 and back, moving simultaneously and in opposite directions. The total wipe pattern is nearly a quarter circle, 86 degrees for the embodiment disclosed. The height of windshield 12 compared to its width is such that, in order to wipe a sufficient area, wipers 14 and 16 must be long enough to overlap at inner wipe, with the driver side wiper 14 lying on top, and the other wiper 16 on bottom. Thus, the inner wipe positions 11 and 12 are not exactly identical, although they are both close to horizontal. The inevitable problem with such a system is that the top and bottom wipers 14 and 16 have a zone of potential collision at the beginning and end of each wipe cycle, a zone that extends to about 35 degrees from inner wipe here. The drive mechanism must provide a means from preventing collision in that zone.

Figure 2:
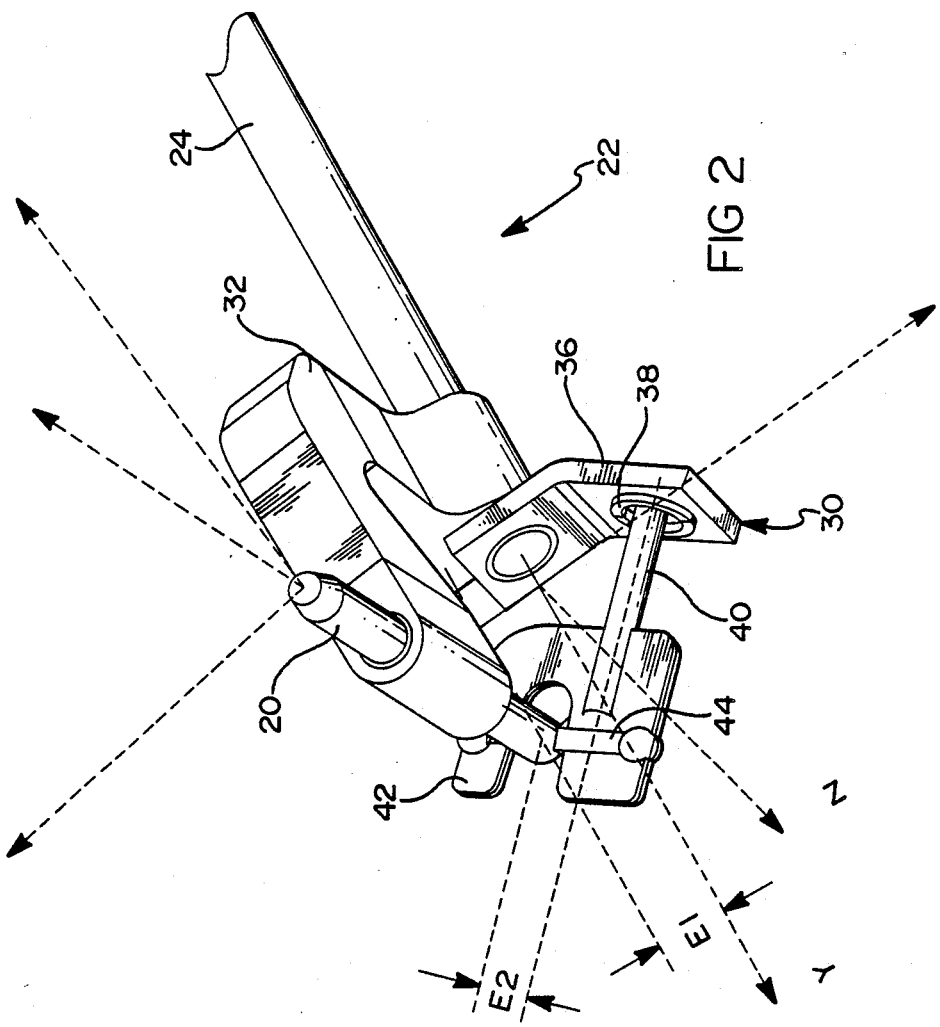
FIG. 2 is an enlarged perspective view of one spatial mechanism and one end of the drive shaft.

Referring next to FIGS. 1 and 2, the drive mechanism of the invention, a preferred embodiment of which is designated generally at 22, includes a straight, tubular drive shaft 24, a motor 26, and a pair of spatial mechanisms, indicated generally at 28 and 30 respectively. Motor 26 is fixed to vehicle body 10, and adapted to turn drive shaft 24 at a substantially constant angular rate, one revolution per second as disclosed. A pair of generally L shaped journal brackets 32 and 34 fixed to vehicle body provide a journal for the ends of drive shaft 24, and also for the wiper shafts 18 and 20. Brackets 32 and 34 may be made of relatively lightweight material, such as plastic. The brackets 32 and 34 locate drive shaft 24 with its axis running across vehicle body 10 below the lower edge of windshield 12, but not exactly horizontal. Instead, the axis of drive shaft 24 is cocked slightly from the horizontal, and thus extends diagonally between the axes of the wiper shafts 18 and 20, rather than intersecting them. This creates an equal and opposed offset of the axis of drive shaft 24 from each wiper shaft 18 and 20. In the embodiment disclosed, that offset, indicated at E1, is approximately 14 mm, and is thus not large enough to significantly enlarge the under hood space envelope occupied by drive shaft 24, compared to what it would occupy if it were perfectly horizontal and square to the wiper shafts 18 and 20. The offset E1 is sufficient to prevent wiper collision, however, as will be described below.

Referring next to FIG. 2, each spatial mechanism 28 and 30 has essentially identical components, although the mechanisms themselves are not identically arranged. Therefore, the second spatial mechanism 30, the one that runs the bottom wiper 16, is described in detail, while the components of the first, 28, are given the same number with a prime ('). Spatial mechanism 30 is a four bar type, with an input crank 36 fixed at one end to the end of the drive shaft 4. At the other end of input crank 36, a spherical bearing 38 with a central cylindrical passage slidably and rockingly receives a pin 40 of a yoke 42. Yoke 42 is pivoted by a pivot shaft 44 to the lower end of wiper shaft 20. As best seen in FIG. 2, yoke 42 is not symmetrical to the center line of pin 40, but has a secondary offset E2 therefrom, of about 19 mm, the purpose for which is described below. The location of the wiper shaft 20 and drive shaft 24 is a given, as is the desired wipe pattern of the bottom wiper 16. Starting with those constraints, one can choose the various lengths and dimensions for input crank 36 and yoke 42 that will give the desired wipe pattern. No attempt is made to give analytical formulae to absolutely determine those lengths, although such could be developed, once the general arrangement of the invention is known. Here, the component sizing was actually worked out empirically with computer simulation techniques. In effect, the component sizes that would give the desired wipe pattern were determined through computerized trial and error.

Figure 3:
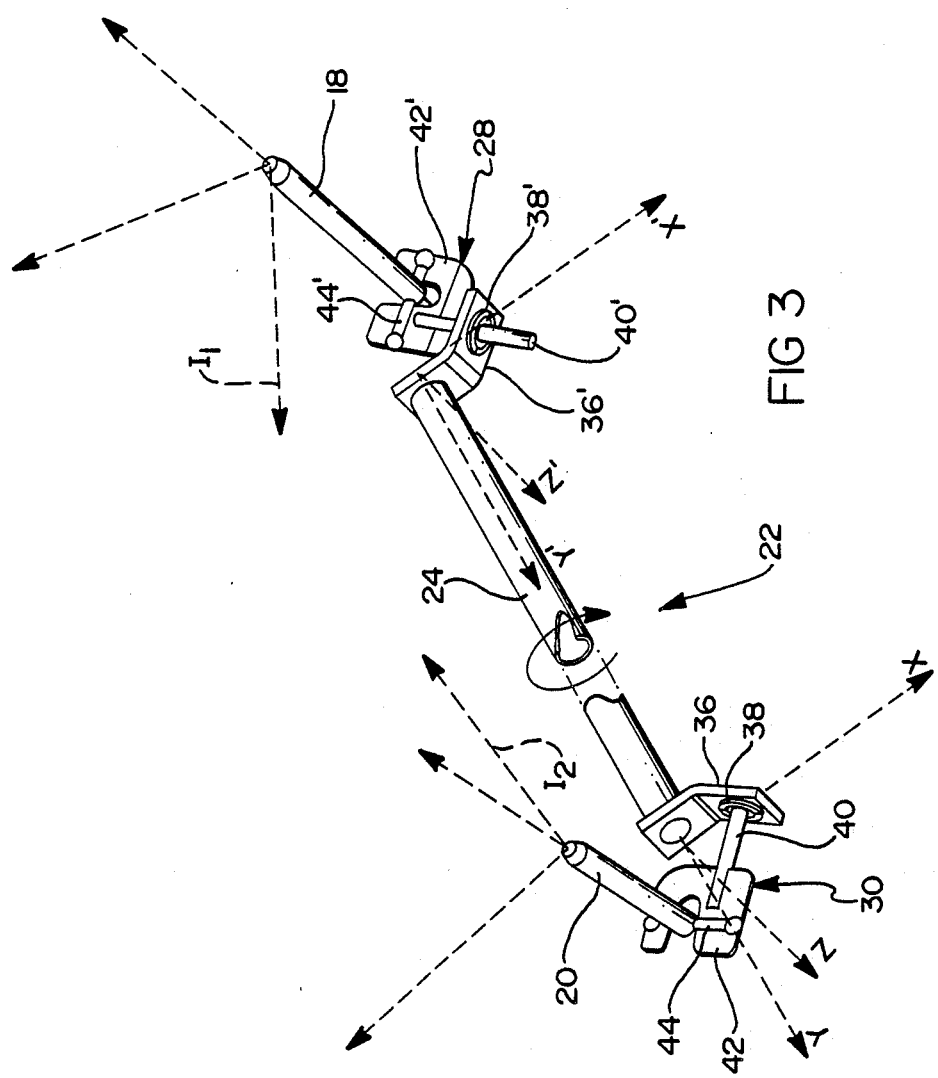
FIG. 3 is a view of the drive mechanism alone at the zero degree input position.

Referring next to FIG. 3, the relative locations of the various components of the second spatial mechanism 30 are indicated with a coordinate system shown by dotted lines and arrows, where the Y axis is the center line of the drive shaft 24, the X axis is ninety degrees to Y, and the Z axis is orthogonal to both Y and X. The equivalent coordinates for first spatial mechanism 28 are primed. Input angles for drive shaft 24 are measured from X down. A three dimensional coordinate system is also shown for the top and bottom wipers 14 and 16 in dotted lines, with the vertical coordinate axes being the center lines of the wiper shafts 18 and 20. The inner wipe positions 11 and 12 constitute one of the other coordinate axes, and the remaining coordinate axes are orthogonal to both the wiper shaft axes and the inner wipe positions. Having determined the lengths and sizes of the components of the spatial mechanisms 28 and 30 as described above, the next step is to fix them relative to each other. FIG. 3 shows the zero input position, with the wipers 14 and 16 both at inner wipe. For spatial mechanism 30, the input crank 36 is fixed to the end of the drive shaft 24 such that, when the bottom wiper 16 is at inner wipe, then the central axis of drive shaft 24, the center point of spherical bearing 38, and the point where the central axis of wiper shaft 20 intersects pivot shaft 44, are all three coplanar. The same would hold for the corresponding components in spatial mechanism 28. As can be seen, the spatial mechanisms 28 and 30 are not exact mirror images of one another. For 30, the pin 40 is withdrawn from spherical bearing 38, while for 28, the pin 40' extends farther though its spherical bearing 38'. Operation of the drive mechanism 22 will be described next.

Figure 4:
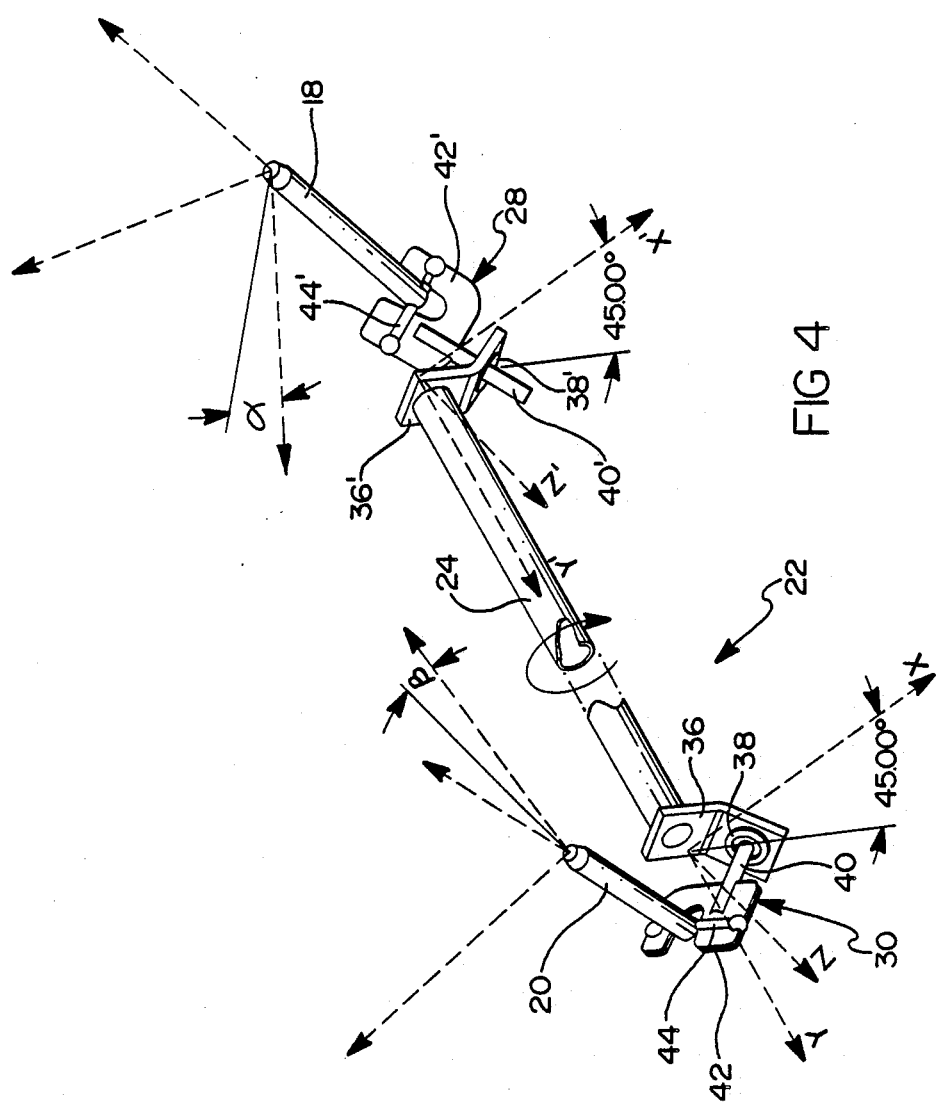
FIG. 4 is a view of the drive mechanism at the 45 degree input position.
Figure 5:
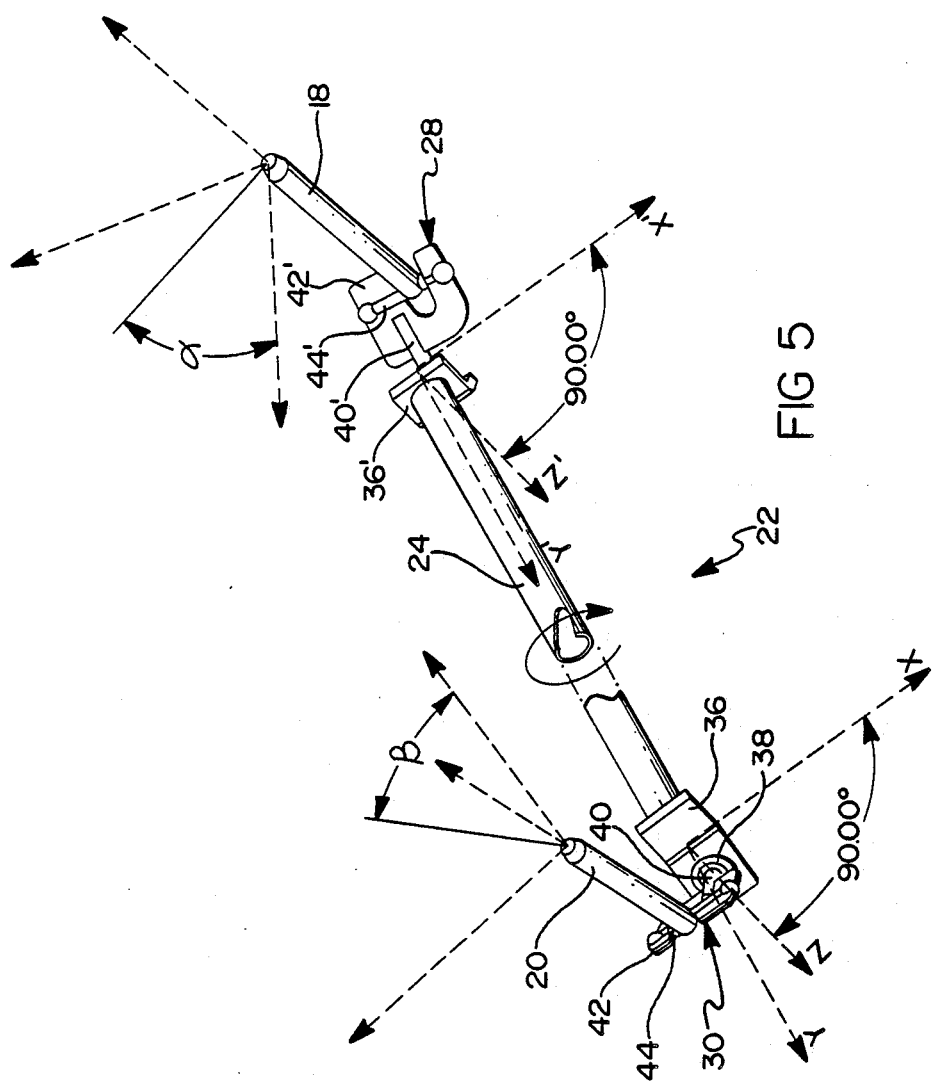
FIG. 5 is a view of the drive mechanism at the 90 degree input position.
Figure 6:
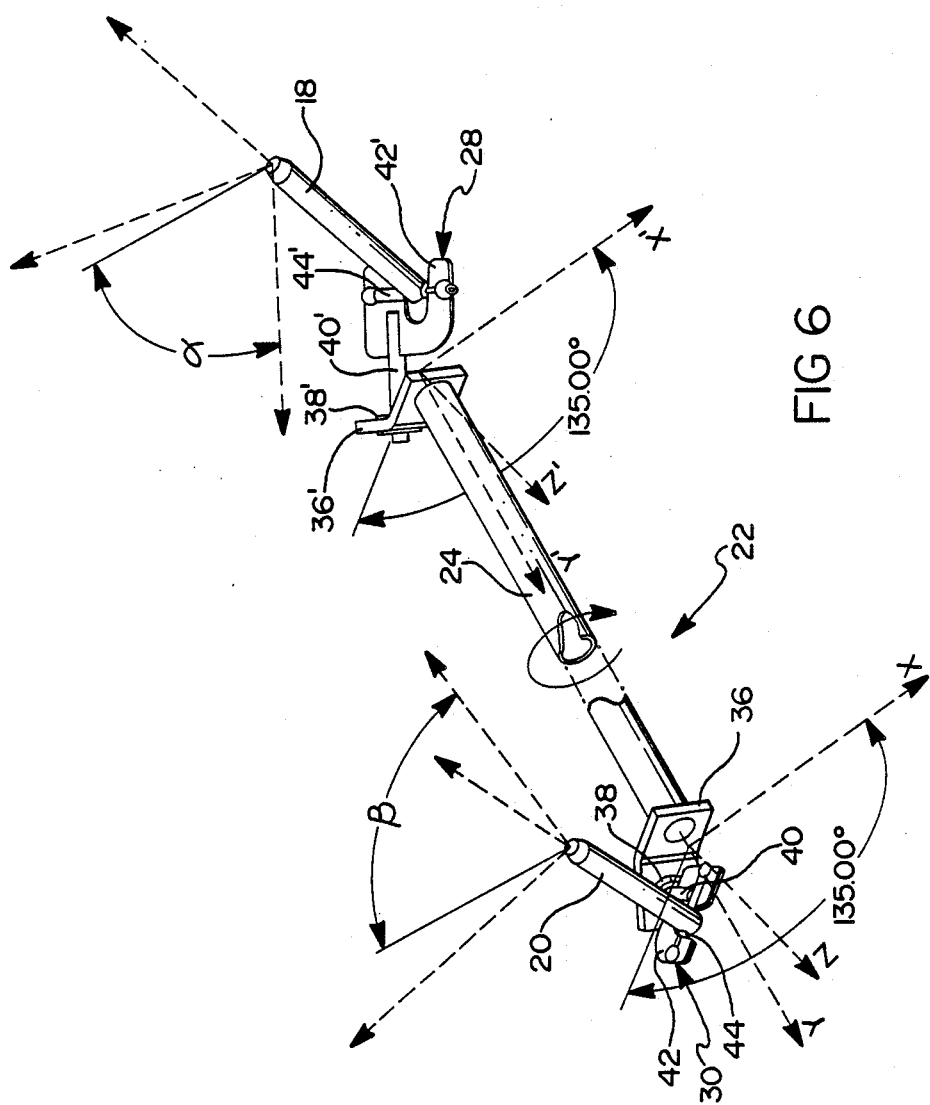
FIG. 6 is a view of the drive mechanism at the 135 degree input position.
Figure 7:
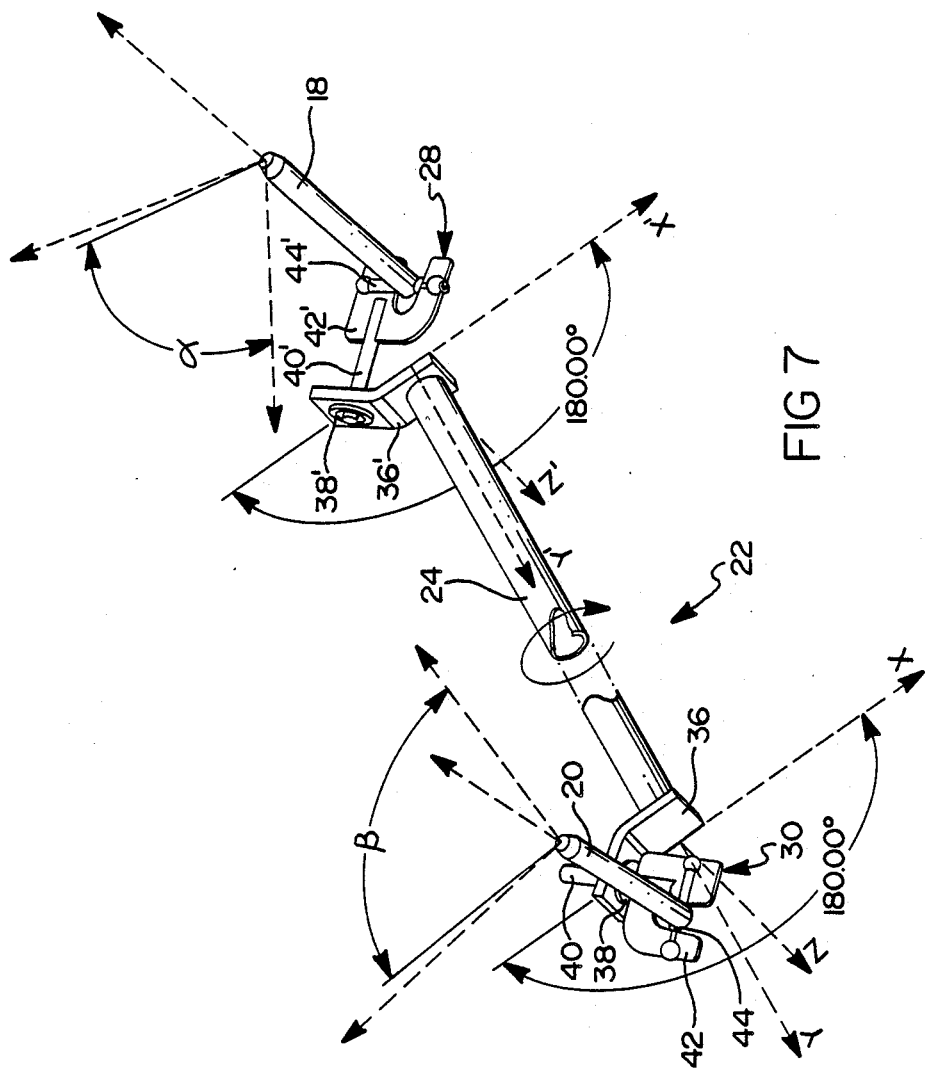
FIG. 7 is a view of the drive mechanism at the 180 degree input position.
Figure 8:
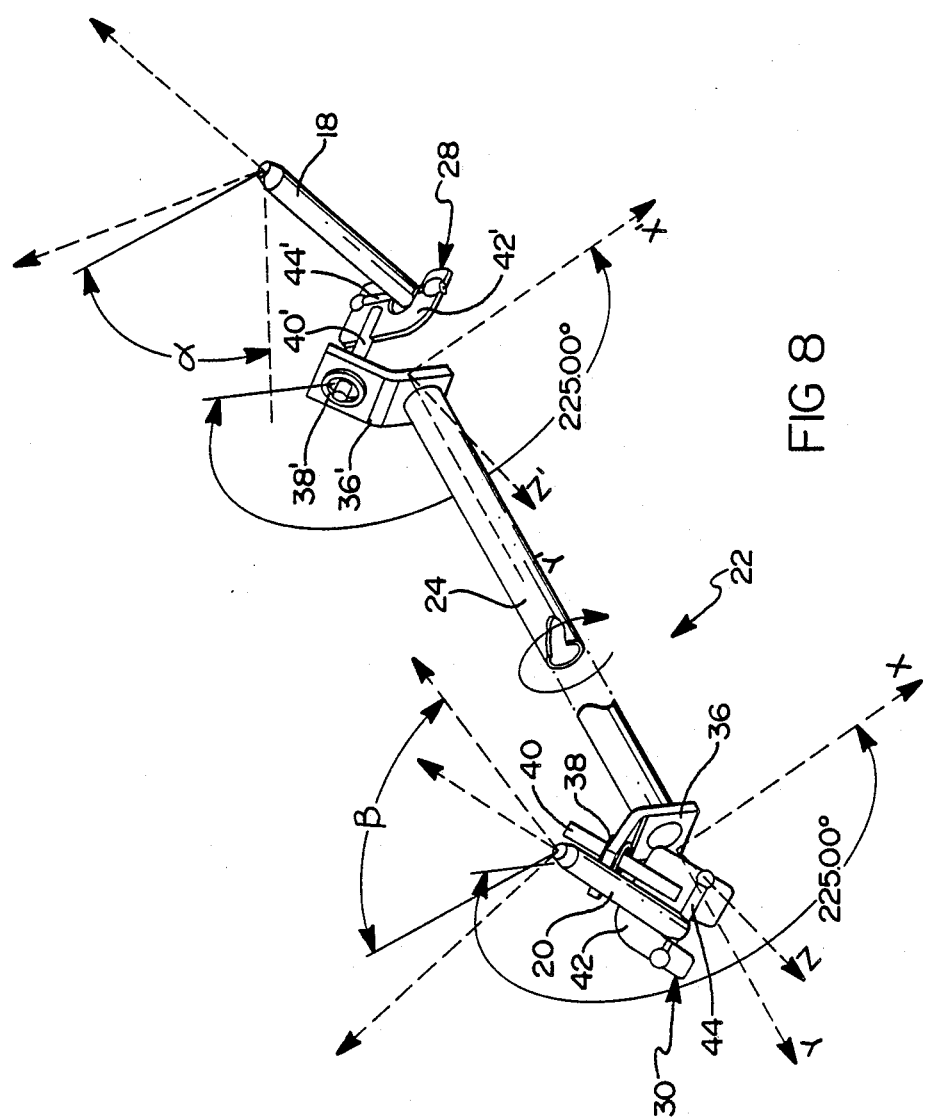
FIG. 8 is a view of the drive mechanism at the 225 degree input position.
Figure 9:
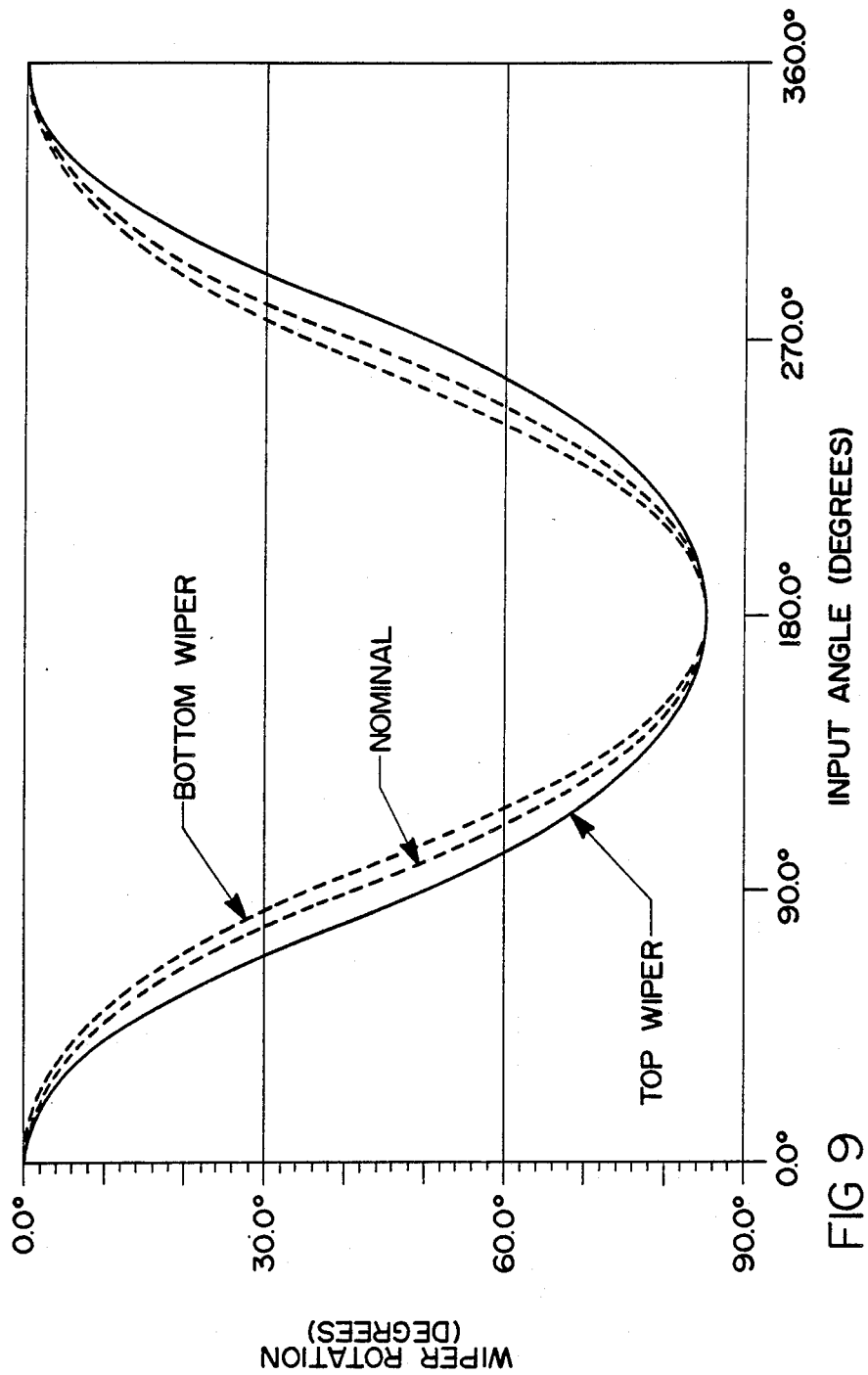
FIG. 9 is a graph showing the angular position of the two wipers over one wiping cycle.
Figure 10:
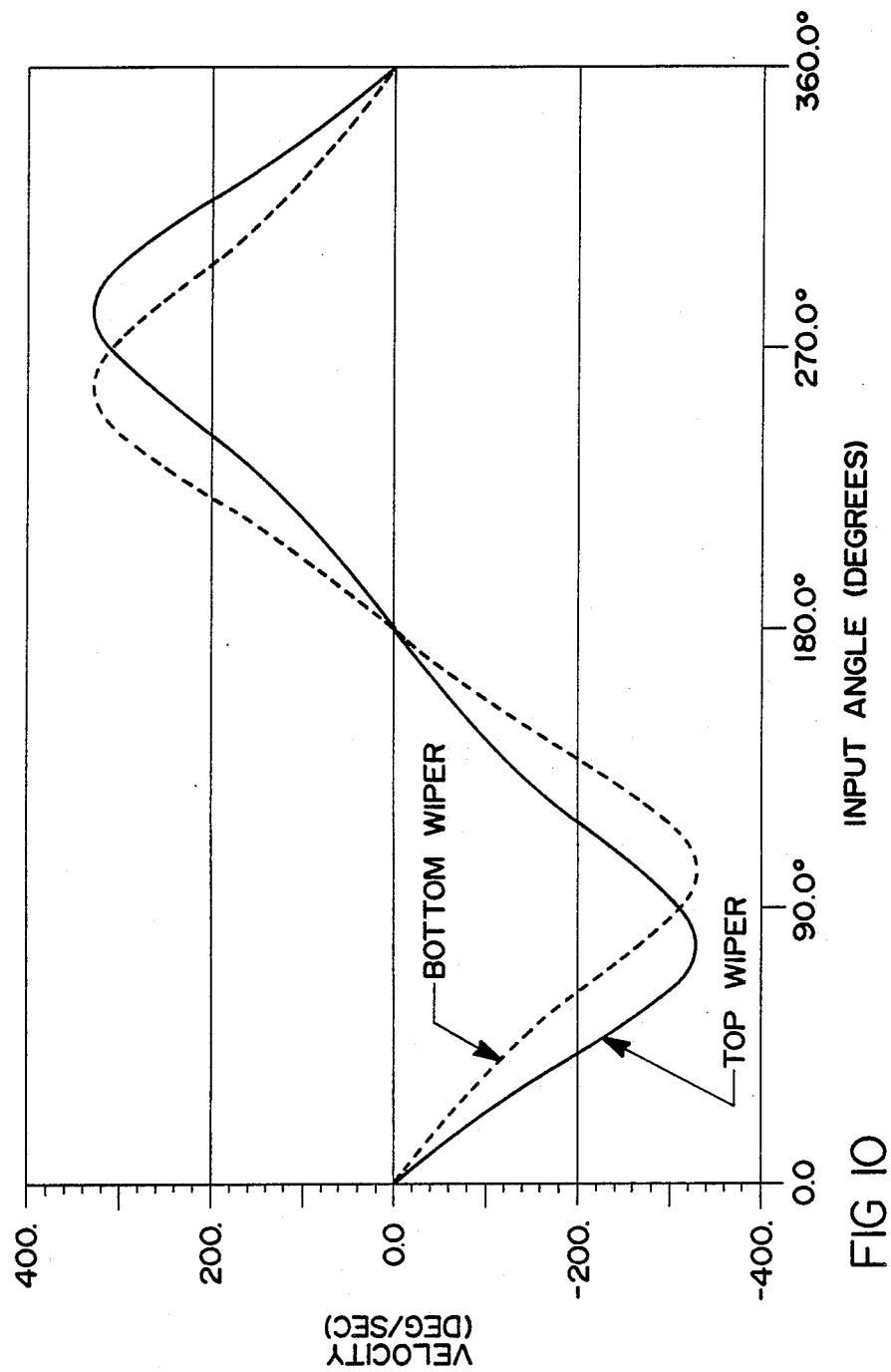
FIG. 10 is a graph showing the angular velocity of the two wipers over one wiping cycle.

Referring next to FIGS. 4, 9 and 10, as motor 26 turns drive shaft 24 one quarter turn, each input crank 36 and 36' turns with it. Pin 40 begins to push farther through its spherical bearing 38, although that is not visible in FIG. 4, and pin 40' begins to pull farther out of its spherical bearing 38, The yokes 42 and 42' are rocked about their respective pivot shafts 44 and 44', and the wiper shafts 20 and 18 begin to turn. The wipers 14 and 16 are thereby moved up by an angular amount from the inner wipe positions 11 and 12 respectively, indicated at alpha and beta. Alpha and beta are not equal, however, being about 13 degrees and 7 degrees respectively at that point. As can be clearly seen in FIG. 10, the top wiper 14 moves up faster from 11 than the bottom wiper 16 does from 12. Although the speed of each wiper 14 and 16 is arbitrarily designated as negative over the first half of the wipe cycle and positive for the second, the absolute value of the speed of the top wiper 14 is clearly initially greater than the bottom wiper 16. This position and velocity differential is caused by the opposed primary offsets E1 described above. This can best be seen in FIG. 9, where the angular position of each wiper 14 and 16 as a function of drive shaft 24 input is shown, compared to the nominal position of a single wiper driven by a spatial mechanism with no offset. The angular position of the top wiper 14, compared to the nominal, is asymmetrically shifted in one direction, that is, the curve is wider than the nominal, rather than having the same shape as the nominal curve. The angular position versus input of the bottom wiper 16, compared to the nominal, is asymmetrically shifted in the other direction, that is, its curve is narrower. More about the choice of E1 will be described below.

Figure 11:
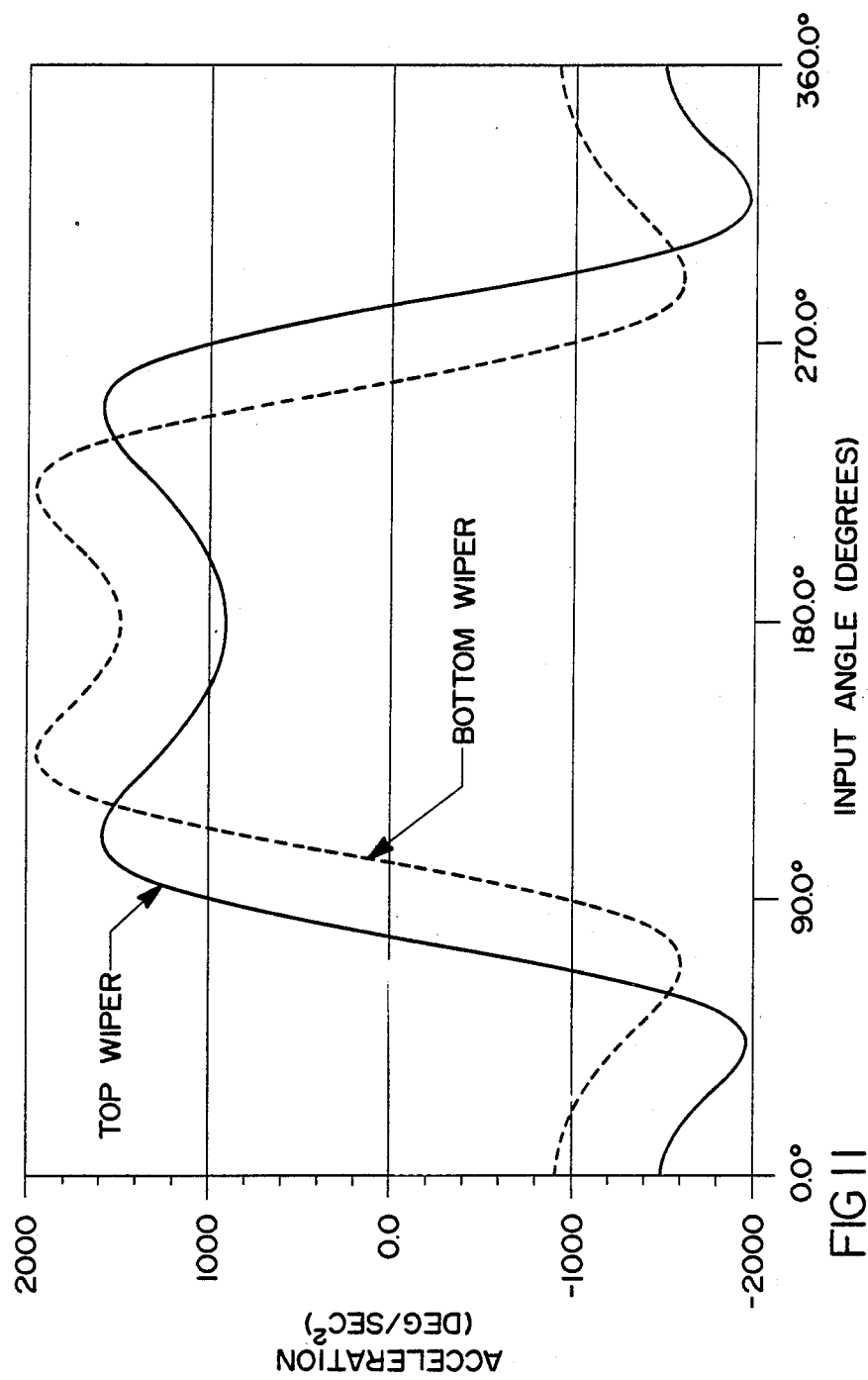
FIG. 11 is a graph showing the acceleration of the two wipers over one wiping cycle.

Referring next to FIGS. 5 through 11, the angular positions, speeds and accelerations of the wipers 14 and 16 at other input positions throughout one complete wipe cycle may be seen. The position and speed differential between the wipers 14 and 16 is great enough that they avoid collision until they are entirely out of the zone of potential collision near inner wipe noted above. Eventually, as drive shaft 24 continues to turn at a constant rate, the speeds of wipers 14 and 16 begin to approach one another and cross, and the initially faster top wiper 14 becomes the slower, and vice versa. That velocity crossing point is at approximately the 90 degree input angle position, when the wipers 14 and 16 are at approximately the 48 degree and 34 degree position in the wipe cycle respectively. From that point on, top wiper 14 remains the slower and bottom wiper 16 the faster wiper, although the speeds again eventually begin to approach one another, becoming equal again as both wipers 14 and 16 stop at at the outer wipe position. At outer wipe, the coplanar condition described for inner wipe is again achieved, and the pins 40 and 40' have reversed themselves from their 0 degree input position. For the second half of the wipe cycle, as the wipers 14 and 16 return to inner wipe, the bottom wiper 16 starts out faster, and top wiper 14 slower, although their speeds cross at the equivalent point, 270 degrees input. However, as may be from FIG. 9, the angular position of bottom wiper 16 stays far enough ahead of top wiper 14 throughout the second half of the wipe cycle that collision is again avoided as the wipers 14 and 16 again approach inner wipe. In addition to collision avoidance, as best seen in FIG. 11, the absolute value of the angular accelerations of both wipers 14 and 16 are less than the maximum at both inner and outer wipe. The slope of the acceleration curve, which is indicative of the rate of change of acceleration, known as "jerk", is also near zero at inner and outer wipe, so wiper whip is avoided.

Variations of the preferred embodiment may be made within the broad teachings of the invention. No analytical formula is given for how great a wiper position and speed differential will result from a given offset E1, as that can also be determined empirically from computer simulations. Every wiper system will have different wiper lengths and overlaps, different wipe patterns, and different zones of potential wiper collision. However, understanding that the primary offset E1 will yield a wiper position and speed differential per se, as the invention teaches, various offsets may be simulated and tried until collision avoidance is achieved. The offset of each wiper shaft 18 and 20 need not be made identical. However, doing so creates the situation where the speed of one wiper at any point in the cycle is, in effect, the complement of the other. That is, for example, at the 45 degree input position in the first half of the wipe cycle, the velocity differential between the wipers 14 and 16 is the same as at the equivalent point in the other half of the wipe cycle, 225 degrees, even though wiper 14 is the faster wiper at the 45 degree point, but the slower at the 225 degree point. This gives a smooth appearing wipe pattern, and allows for the commonalty of parts between the two spatial mechanisms 28 and 30, which is a great advantage in manufacturing and assembly. Other spatial mechanisms could be used. For example, the secondary offset E2 alluded to above is not necessary to the basic operation of the invention. However, it does cut down on the degree to which the spherical bearings 38 and 38' rock during operation as a result of the primary offset E1. Also, shaft 24 could, conceivably, be divided into two parts, with a universal joint or the like joining the two parts in a shallow V shape. In that case, each end of the drive shaft would rotate about its own, respective central axis. Such a configuration would accommodate an under hood space with a large degree of curvature, while the shaft ends would still turn one to one, and drive the wipers simultaneously as described. However, the single, straight, tubular drive shaft 24, slightly cocked from horizontal to extend between the two wiper shafts and give the opposed offsets is particularly simple and compact. Therefore, it will be understood that it is not intended to limit the invention to just the embodiment disclosed.

The embodiments of the invention in which an exclusive property or privilege is claimed are defined as follows:

1. In a vehicle body having a windshield, a drive mechanism for driving a pair of wipers simultaneously and in opposite directions over said windshield through a wipe cycle extending from a substantially horizontal inner wipe position to an outer wipe position and back to inner wipe, said wipers also being sufficiently long to overlap near their inner wipe positions with one wiper on top and the other on bottom, said drive means comprising, a drive shaft with two ends journaled to said vehicle body so that each end thereof is rotatable about a respective central axis, a motor adapted to rotate said drive shaft, a first wiper shaft to which said top wiper is mounted journaled to said vehicle body respective to one end of said drive shaft so as to be oscillatable about a central axis spaced to one side of said drive shaft one end central axis by a first offset, a second wiper shaft to which said bottom wiper is mounted journaled to said vehicle body respective to the other end of said drive shaft so as to be oscillatable about a central axis spaced to the opposite side of said drive shaft other end central axis by a second offset, a first spatial mechanism operative between said first wiper shaft and said drive shaft to oscillate said first wiper shaft between limit positions corresponding to the inner wipe and outer wipe positions of said top wiper as said drive shaft rotates, with the angular position of said top wiper as a function of the angular rotation of said drive shaft, being asymmetrically shifted in one direction, by virtue of said first offset, a second spatial mechanism operative between said second wiper shaft and said drive shaft to oscillate said second wiper shaft between limit positions corresponding to the inner wipe and outer wipe positions of said bottom wiper as said drive shaft rotates, with the angular position of said bottom wiper as a function of the angular rotation of said drive shaft, being asymmetrically shifted in the other direction, by virtue of said second and opposed offset, said first and second offsets further being sufficient such that the angular position difference between said top and bottom wipers is sufficient at corresponding points in said wipe cycle near their inner wipe positions to prevent said wipers from colliding.

2. In a vehicle body having a windshield, a drive mechanism for driving a pair of wipers simultaneously and in opposite directions over said windshield through a wipe cycle extending from a substantially horizontal inner wipe position to an outer wipe position and back to inner wipe, said wipers also being sufficiently long to overlap near their inner wipe positions with one wiper on top and the other on bottom, said drive means comprising, a drive shaft with two ends journaled to said vehicle body so that each end thereof is rotatable about a respective central axis, a motor adapted to rotate said drive shaft, a first wiper shaft to which said top wiper is mounted journaled to said vehicle body respective to one end of said drive shaft so as to be oscillatable about a central axis spaced to one side of said drive shaft one end central axis by an offset, a second wiper shaft to which said bottom wiper is mounted journaled to said vehicle body respective to the other end of said drive shaft so as to be oscillatable about a central axis spaced to the opposite side of said drive shaft other end central axis by substantially the same offset, a first spatial mechanism operative between said first wiper shaft and said drive shaft to oscillate said first wiper shaft between limit positions corresponding to the inner wipe and outer wipe positions of said top wiper as said drive shaft rotates, with the angular position of said top wiper, as a function of the angular rotation of said drive shaft, being asymmetrically shifted in one direction, by virtue of said offset, a second, spatial mechanism operative between said second wiper shaft and said drive shaft to oscillate said second wiper shaft between limit positions corresponding to the inner wipe and outer wipe positions of said bottom wiper as said drive shaft rotates, with the angular position of said bottom wiper, as a function of the angular rotation of said drive shaft, being asymmetrically shifted in the other direction, by virtue of said opposed offset, said offset further being sufficient such that the angular position difference between said top and bottom wipers is sufficient at corresponding points in said wipe cycle near their inner wipe positions to prevent said wipers from colliding, with the angular speed differential between said wipers being the same at corresponding points in the wipe cycle, by virtue of said first and second wiper shaft offsets being substantially the same.

3. In a vehicle body having a windshield with a lower edge, a drive mechanism for driving a pair of wipers simultaneously and in opposite directions over said windshield through a wipe cycle extending from a substantially horizontal inner wipe position to an outer wipe position and back to inner wipe, said wipers also being sufficiently long to overlap near their inner wipe positions with one wiper on top and the other on bottom, said drive means comprising, a straight, tubular drive shaft with two ends journaled to said vehicle body as to be rotatable about a central axis along and near said windshield lower edge, a motor adapted to rotate said drive shaft, a first wiper shaft to which said top wiper is mounted journaled to said vehicle body respective to one end of said drive shaft so as to be oscillatable about a central axis spaced to one side of said drive shaft central axis by a first offset, a second wiper shaft to which said bottom wiper is mounted journaled to said vehicle body respective to the other end of said drive shaft so as to be oscillatable about a central axis spaced to the opposite side of said drive shaft central axis by a second offset, a first spatial mechanism operative between said first wiper shaft and said drive shaft to oscillate said first wiper shaft between limit positions corresponding to the inner wipe and outer wipe positions of said top wiper as said drive shaft rotates, with the angular position of said top wiper as a function of the angular rotation of said drive shaft, being asymmetrically shifted in one direction, by virtue of said first offset, a second spatial mechanism operative between said second wiper shaft and said drive shaft to oscillate said second wiper shaft between limit positions corresponding to the inner wipe and outer wipe positions of said bottom wiper as said drive shaft rotates, with the angular position of said bottom wiper as a function of the angular rotation of said drive shaft, being asymmetrically shifted in the other direction, by virtue of said second and opposed offset, said first and second offsets further being sufficient such that the angular position difference between said top and bottom wipers is sufficient at corresponding points in said wipe cycle near their inner wipe positions to prevent said wipers from colliding.

* * * * *